Patented May 17, 1949

UNITED STATES PATENT OFFICE 2,470,191

RAPID RIPENING OF CELLULOSE ESTERS

George W. Seymour, Blanche B. White, and Anthony J. Bellucci, Cumberland, Md., assignors to Celanese Corporation of America, a corporation of Delaware No Drawing. Application December 6, 1945, Serial No. 633,268

11 Claims. (Cl. 260—227)

This invention relates to the production of organic acid esters of cellulose, such as cellulose acetate, and relates more particularly to an improved process for the ripening or hydrolysis of organic acid esters of cellulose whereby the rate at which hydrolysis or ripening is effected is greatly accelerated.

An object of this invention is to provide a novel process for the ripening or hydrolysis of organic acid esters of cellulose which effects the ripening and hydrolysis in a relatively short period of time and which produces organic acid esters of cellulose of a high order of stability.

Another object of this invention is the provision of an improved ripening process for the ripening of organic acid esters of cellulose which enables the ripening or hydrolysis to be conducted at a greatly increased speed with little or no acid catalyst present in the ripening medium to air the ripening of said cellulose esters.

Other objects of this invention will appear from the following detailed description.

In the process of preparing organic acid esters of cellulose, such as cellulose acetate, for example, the esterification reaction is usually carried out by treating cellulose with an organic acid anhydride in the presence of a catalyst, such as sulfuric acid or phosphoric acid, and an organic acid diluent, or solvent, for the cellulose ester being formed. The fully esterified cellulose tri-ester produced is obtained in the form of a viscous, homogeneous solution in the organic acid diluent employed. Water is then added to this primary cellulose esters solution in an amount sufficient to convert any organic acid anhydride remaining to the corresponding acid. The primary cellulose ester, usually after the addition of a further quantity of water, is permitted to hydrolyze or ripen in solution from the cellulose tri-ester initially formed to a secondary cellulose ester, i. e. one of a lower degree of esterification, having the desired solubility characteristics. During ripening not only are acyl groups hydrolyzed but, in addition, combined sulfuric acid is removed from the cellulose ester. Water and/or other non-solvent for the cellulose ester is then added in amounts sufficient to precipitate the ripened or secondary cellulose ester from solution. The precipitated cellulose ester is washed with water to remove as much acid and other non-cellulose ester materials as possible and is then subjected to a stabilizing treatment with the object of still further reducing its content of combined sulfuric acid. Any combined sulfuric acid imparts to the cellulose ester a tendency to decompose, degrade and/or discolor, particularly when the cellulose ester is exposed to heat as during molding operations. The stability is measured by the degree of acidity developed when a sample of the cellulose ester is treated with distilled water at elevated temperature and pressure for a predetermined period of time. The development of excess acidity denotes a product of unsatisfactory stability.

During the preparation of organic acid esters of cellulose by the above method, the esterification may take from 1½ to 7 hours and ripening from 20 to 45 or 50 hours, at temperatures of 20 to 35° C., while the stabilizing treatment may take from 3 to 6 hours to achieve the desired stability in the product. Any reduction in the time necessary for reaching the desired acyl value and any improvement in the stability characteristics of said ripened organic acid esters of cellulose which can be effected during the ripening process itself will, obviously, be of great economic value.

We have now found that ripened or hydrolyzed organic acid esters of cellulose of a high order of stability and of any desired acyl value may be obtained in a very short time by an improved ripening process whereby the primary organic acid ester of cellulose initially obtained is hydrolyzed to a secondary cellulose ester of the desired acyl value and stability characteristics. In accordance with our novel process, the ripening or hydrolysis of the primary organic acid ester of cellulose may be achieved in an exceedingly short period of time by neutralizing all or substantially all of the acid catalyst in the primary cellulose ester solution, adding water for ripening thereto and then permitting the organic acid ester of cellulose in the neutralized solution to ripen at temperatures of at least 125° C. under a pressure of at least 20 pounds per square inch. The use of the higher temperatures and pressures in accordance with our novel process enables the organic acid esters of cellulose to be ripened to the desired acyl value in a very short time, usually in less than one hour, which ripening period is but a fraction of that necessary when ripening is conducted in the usual manner. Furthermore, the ripened cellulose esters obtained by our novel ripening process possess substantially improved stability characteristics and do not require any further stabilization.

Thus, in the preparation of highly stable ripened or hydrolyzed cellulose acetate by our novel process, cellulose, with or without a pretreatment to render it more reactive, is acetylated with acetic anhydride and an acid catalyst, e. g. sulfuric acid, employing glacial acetic acid as solvent for the cellulose acetate formed. The pretreatment may comprise treating the cellulose with organic acids or organic acids containing some sulfuric acid. Part of the sulfuric acid employed as the catalyst and part of the glacial acetic acid may be introduced in the pretreatment. When acetylation is completed, all or substantially all of the sulfuric acid in the primary solution of cellulose acetate obtained is neutralized by the addition of a sufficient quantity of a suitable neutralizing agent thereto. Water in an amount sufficient to react with all of the anhydride remaining is then added together with additional water for ripening in an amount of 100 to 400% on the weight of the original cellulose employed. The neutralized primary solution of cellulose acetate is then heated and ripening is conducted at a temperature of at least 125° C. under a pressure of at least 20 pounds per square inch and, preferably, 80 to 100 pounds per square inch or more. Acetone-soluble cellulose acetates of an acetyl value of 53 to 56%, calculated as acetic acid may be obtained by ripening under these conditions of elevated temperature and pressure for less than one hour, ripening for ¼ to ¾ of an hour usually being sufficient. The maximum temperature at which the ripening may be conducted is only limited by the thermal decomposition temperature of the cellulose acetate in solution. The ripened or hydrolyzed cellulose acetate is then precipitated from solution by the addition of an excess of water thereto and may then be washed neutral and dried. The cellulose acetates obtained are exceedingly stable. Very little acidity is developed when said cellulose acetates are heated with water under conditions of elevated temperature and pressure.

Any suitable neutralizing agent may be employed, such as for example, magnesium acetate, zinc acetate, aluminum acetate, calcium acetate, strontium acetate, barium acetate, strontium oxide, barium oxide, strontium hydroxide, barium hydroxide, and magnesium carbonate. We prefer to avoid the use of neutralizing agents which form sodium salts, since the presence of sodium salts during ripening is undesirable as said sodium salts, even in relatively small quantities, tend to inhibit splitting off of sulfate during ripening. In larger concentrations, the presence of sodium salts may even prevent the splitting off of said sulfate.

The amount of sulfuric acid in the neutralized primary solution of cellulose acetate during ripening or hydrolysis, where some free acid is allowed to remain, is preferably no greater than about 0.1 to 0.15% by weight, on the primary solution. The sulfuric acid present may be reduced to this amount by neutralizing substantially all of the sulfuric acid catalyst remaining by the addition of a suitable quantity of the neutralizing agent to the primary solution. A slight excess of neutralizing agent may also be added to the primary solution of cellulose acetate so that all of the sulfuric acid is neutralized and an excess of neutralizing agent will be present in the primary solution during ripening or hydrolysis. Where an excess of neutralizing agent is employed, such as, for example, an excess of magnesium carbonate, the most advantageous results are obtained where the primary solution undergoing ripening contains an excess of the latter of from about 0.0 to 0.2% by weight, calculated as magnesium oxide. Whether all or substantially all of the sulfuric acid is neutralized by the addition of a sufficient quantity of neutralizing agent, ripening at elevated temperatures and pressures, in accordance with our novel process, yields highly stable cellulose acetates of any desired acetyl value in an exceedingly short period of time.

We prefer, however, to conduct the ripening in the presence of excess alkaline neutralizing agent, since cellulose esters of a higher degree of polymerization are obtained under such conditions. The loss in molecular weight is less rapid where excess alkaline neutralizing agent is present during ripening than under those conditions where ripening is conducted in the presence of some free sulfuric acid.

When ripening under pressure at high temperatures, in accordance with our novel process, it is most desirable that ripening be carried out with as large a quantity of water as possible present in the primary solution without, however, causing any precipitation of the cellulose acetate before the latter has been ripened to the desired acetyl value. Usually, large quantities of water, e. g. 100 to 400% on the weight of the cellulose esterified, cannot be added to the primary solution when the latter contains a rather high proportion of combined sulfates without causing some precipitation. The water addition may, therefore, be made in two stages. An initial water addition, e. g. 25 to 50% on the weight of the cellulose esterified may first be added and the primary cellulose acetate in solution hydrolyzed for a short time at elevated temperature until the combined sulfates are split off. Higher temperatures with little water present favor the splitting off of the combined sulfates. After the combined sulfates have been removed a much larger quantity of water may then be added, e. g. 100 to 400% on the weight of the cellulose, and the ripening of the cellulose acetate to the desired acetyl value then effected under conditions of elevated temperature and pressure.

The advantages of a high temperature with little water present, which conditions, as indicated above, favor the splitting off of the sulfates, may be obtained by heating the primary cellulose acetate solution to the desired temperature by the direct injection of steam therein. Under the localized conditions created by this method of heating, only relatively small quantities of water are added through the medium of the condensed steam and the combined sulfates preesnt are caused to split off almost instantaneously. A large water addition can then be made either directly or through the medium of condensing steam without causing any precipitation of the cellulose acetate and the ripening of the primary cellulose acetate in solution continued until the desired acetyl value is reached. Since ripening is completed in a very short time following the completion of the acetylation reaction, the time cycle enables a practically continuous process to be employed.

In order further to illustrate our invention, but without being limited thereto, the following examples are given:

*Example I*

162 parts by weight of cotton are pretreated with a mixture of 0.85 part by weight of sulfuric acid, 0.85 part by weight of water and 60 parts by weight of glacial acetic acid. The mixture is tumbled for a short time to ensure a uniform distribution of the liquid and is then allowed to stand for 2 hours at a temperature of 25° C. to complete the activation of the cellulose. After this pretreatment, the cellulose is entered into an acetylizer containing 410 parts by weight of acetic anhydride, 560 parts by weight of acetic acid and 22.5 parts by weight of sulfuric acid. The acetylation reaction is allowed to continue for 1½ hours with a peak temperature of 35 to 45° C. being reached. At the completion of esterification, the sulfuric acid in the primary solution of cellulose acetate is completely neutralized by the addition of a sufficient quantity of magnesium carbonate thereto, a solution which contains 0.0 0.5% excess magnesium carbonate, calculated as magnesium oxide being obtained. Water is added to react with all of the acetic anhydride remaining and an additional quantity of water in an amount equal to 100% on the weight of the original cotton acetylated is then added for ripening. The primary solution of cellulose acetate is charged into an autoclave and heated to a temperature of 180 to 185° C. under pressure of 80 to 90 pounds per square inch. The cellulose acetate in solution is ripened under these conditions for ½ hour and the ripened solution is then removed from the autoclave and the cellulose acetate in solution precipitated by the addition of an excess of water thereto. The cellulose acetate obtained has an acetyl value of 56%, calculated as acetic acid, a degree of polymerization of 142 and is sufficiently stable so that further stabilization is unnecessary.

*Example II*

The sulfuric acid catalyst present in a primary solution of cellulose acetate, prepared in accordance with the process described in Example I is neutralized with excess magnesium carbonate so that it contains 0.15% excess magnesium carbonate, calculated as magnesium oxide. A water addition of 100% by weight on the cellulose is made and the resulting solution is ripened at a temperature of 185 to 190° C., and at a pressure of 85 to 95 pounds per square inch for ¾ of an hour. The cellulose acetate obtained has an acetyl value of 54.5%, calculated as acetic acid, a degree of polymerization of 175 and is of a higher order of stability.

*Example III*

The sulfuric acid catalyst present in a primary solution of cellulose acetate obtained in accordance with the process described in Example I, is incompletely neutralized by the addition of magnesium carbonate thereto and a primary solution containing 0.1 to 0.15% sulfuric acid is obtained. After the addition of 100% by weight of water, on the cellulose, the primary solution is then ripened at a temperature of 125 to 130° C. under a pressure of 20 pounds per square inch for one hour. The cellulose acetate obtained has an acetyl value of 55.8%, calculated as acetic acid, and is of excellent stability.

*Example IV*

162 parts by weight of cotton are pretreated with a mixture of 0.85 part by weight of sulfuric acid, 0.85 part by weight of water and 60 parts by weight of glacial acetic acid. The mixture is tumbled for a short time to ensure a uniform distribution of the liquid and is then allowed to stand for 2 hours at a temperature of 25° C. to complete the activation of the cellulose. After this pretreatment, the cellulose is entered into an acetylizer containing 410 parts by weight of acetic anhydride, 560 parts by weight of acetic acid and 22.5 parts by weight of sulfuric acid. The acetylation reaction is allowed to continue for 1½ hours with a peak temperature of 35 to 45° C. being reached. After completion of esterification, sufficient magnesium carbonate or acetate is added so that the amount of sulfuric acid is reduced to one half of the original. An addition of 66.5 parts of water is made with stirring, and the mixture is then heated to 100° C. by direct injection of steam. The water content at this point has increased to approximately 162 parts. At this point additional magnesium salts, e. g. magnesium carbonate or magnesium acetate are added thereto, a solution being obtained which contains an excess of 0.0 to 0.5% of magnesium salts calculated as magnesium oxide. The primary solution of cellulose acetate is charged into an autoclave and heated to a temperature of 180 to 185° C. under pressure of 80 to 90 pounds per square inch. The cellulose acetate in solution is ripened under these conditions for ½ hour and the ripened solution is then removed from the autoclave and the cellulose acetate in solution precipitated by the addition of an excess of water thereto. The cellulose acetate obtained has an acetyl value of 56%, calculated as acetic acid, a degree of polymerization of 142 and is sufficiently stable so that further stabilization is unnecessary.

*Example V*

Cellulose is acetylated as described in Example IV and after completion of esterification sufficient magnesium carbonate or acetate is added so that the amount of sulfuric acid present is reduced to one half its original concentration. 40.5 parts water are added with the stirring and the mixture is stirred for 4 hours at 60° C. to split off combined sulfates. Additional magnesium salts are added at this point until a solution is obtained which contains an excess of 0.0 to 0.05% of magnesium salts calculated as magnesium oxide. Another 121.5 parts water are added. The primary solution of cellulose acetate is charged into an autoclave and heated to a temperature of 180 to 185° C. under pressure of 80 to 90 pounds per square inch. The cellulose acetate in solution is ripened under these conditions for ½ hour and the ripened solution is then removed from the autoclave and the cellulose acetate in solution precipitated by the addition of an excess of water thereto. The cellulose acetate obtained has an acetyl value of 53.8%, calculated as acetic acid, a degree of polymerization of 165 and is sufficiently stable so that further stabilization is unnecessary.

While our invention has been more particularly described in connection with the production of highly stable, ripened cellulose acetate, it will be understood, of course, that our novel rapid ripening process employing elevated temperatures and pressures may also be employed in the production of other highly stable ripened or hydrolyzed organic acid esters of cellulose. Examples of other organic acid esters of cellulose which may be prepared by our novel process are cellulose propionate and cellulose butyrate, as well as mixed esters, such as cellulose acetate-propionate, and cellulose acetate-butyrate.

It is to be understood that the foregoing detailed description is given merely by way of illustration and that many variations may be made therein without departing from the spirit of our invention.

Having described our invention, what we desire to secure by Letters Patent is:

1. In a process for the production of highly stable ripened organic acid esters of cellulose wherein cellulose is esterified with an aliphatic acid anhydride employing an inorganic acid as catalyst and an aliphatic acid as a solvent, the steps which comprise neutralizing the acid catalyst in the primary cellulose ester solution obtained on completion of esterification by adding an alkaline neutralizing agent thereto, and then ripening and stabilizing the cellulose ester in the primary solution to a secondary cellulose ester at a temperature of at least 125° C. and at a pressure of at least 20 pounds per square inch.

2. In a process for the production of highly stable ripened organic acid esters of cellulose wherein cellulose is esterified with an aliphatic acid anhydride employing an inorganic acid as catalyst and an aliphatic acid as a solvent, the steps which comprise neutralizing the acid catalyst in the primary cellulose ester solution obtained on completion of esterification by adding an excess of an alkaline neutralizing agent thereto, and then ripening and stabilizing the cellulose ester in the primary solution to a secondary cellulose ester at a temperature of at least 125° C. and at a pressure of at least 20 pounds per square inch.

3. In a process for the production of highly stable ripened organic acid esters of cellulose wherein cellulose is esterified with an aliphatic acid anhydride employing an inorganic acid as catalyst and an aliphatic acid as a solvent, the steps which comprise neutralizing the acid catalyst in the primary cellulose ester solution obtained on completion of esterification by adding an alkaline neutralizing agent thereto so that said solution ranges from an acidity equivalent to about 0.15% sulfuric acid to an alkalinity equivalent to about 0.20% magnesium oxide, and then ripening and stabilizing the cellulose ester at a temperature of at least 125° C. and at a pressure of at least 20 pounds per square inch.

4. In a process for the production of highly stable ripened cellulose acetates wherein cellulose is esterified with an acetic anhydride employing an inorganic acid as catalyst and acetic acid as a solvent, the steps which comprise neutralizing the acid catalyst in the primary cellulose acetate solution obtained on completion of esterification by adding an alkaline neutralizing agent thereto, and then ripening and stabilizing the cellulose acetate in the primary solution to a secondary cellulose acetate at a temperature of at least 125° C. and at a pressure of at least 20 pounds per square inch.

5. In a process for the production of highly stable ripened cellulose acetates wherein cellulose is esterified with acetic anhydride employing an inorganic acid as catalyst and acetic acid as a solvent, the steps which comprise neutralizing the acid catalyst in the primary cellulose acetate solution obtained on completion of esterification by adding an excess of an alkaline neutralizing agent thereto, and then ripening and stabilizing the cellulose acetate in the primary solution to a secondary cellulose acetate at a temperature of at least 125° C. and at a pressure of at least 20 pounds per square inch.

6. In a process for the production of highly stable ripened cellulose acetates wherein cellulose is esterified with acetic anhydride employing an inorganic acid as catalyst and acetic acid as a solvent, the steps which comprise neutralizing the acid catalyst in the primary cellulose acetate solution obtained on completion of esterification by adding an alkaline neutralizing agent thereto, so that said solution ranges from an acidity equivalent to about 0.15% sulfuric acid to an alkalinity equivalent to about 0.20% magnesium oxide, and then ripening and stabilizing the cellulose acetate at a temperature of at least 125° C. and at a pressure of at least 20 pounds per square inch.

7. In a process for the production of highly stable ripened cellulose acetates wherein cellulose is esterified with acetic anhydride employing sulfuric acid as catalyst and acetic acid as a solvent, the steps which comprise neutralizing the sulfuric acid in the primary cellulose acetate solution obtained on completion of esterification by adding an excess of an alkali neutralizing agent thereto, and then ripening and stabilizing the cellulose acetate in the primary solution to a secondary cellulose acetate at an elevated temperature and pressure.

8. In a process for the production of highly stable ripened cellulose acetates wherein cellulose is esterified with acetic anhydride employing sulfuric acid as catalyst and acetic acid as a solvent, the steps which comprise neutralizing the sulfuric acid in the primary cellulose acetate solution obtained on completion of esterification by adding an alkaline neutralizing agent thereto, and then ripening and stabilizing the cellulose acetate in the primary solution to a secondary cellulose acetate at a temperature of at least 125° C. and at a pressure of at least 20 pounds per square inch.

9. In a process for the production of highly stable ripened cellulose acetates wherein cellulose is esterified with acetic anhydride employing sulfuric acid as catalyst and acetic acid as a solvent, the steps which comprise neutralizing the sulfuric acid in the primary cellulose acetate solution obtained on completion of esterification by adding an excess of an alkaline neutralizing agent thereto, and then ripening and stabilizing the cellulose acetate in the primary solution to a secondary cellulose acetate at a temperature of at least 125° C. and at a pressure of at least 20 pounds per square inch.

10. In a process for the production of highly stable ripened cellulose acetates wherein cellulose is esterified with acetic anhydride employing sulfuric acid as catalyst and acetic acid as a solvent, the steps which comprise neutralizing the sulfuric acid in the primary cellulose acetate solution obtained on completion of esterification by adding an alkaline neutralizing agent thereto, so that said solution ranges from an acidity equivalent to about 0.15% sulfuric acid to an alkalinity equivalent to about 0.20% magnesium oxide, and then ripening and stabilizing the cellulose acetate at a temperature of at least 125° C. and at a pressure of at least 20 pounds per square inch.

11. In a process for the production of highly stable ripened cellulose acetates wherein cellulose is esterified with acetic anhydride employing sulfuric acid as catalyst and acetic acid as a solvent, the steps which comprise neutralizing the sulfuric acid catalyst remaining in the primary cellulose acetate solution obtained on completion of esterification by adding magnesium carbonate thereto, so that said solution ranges from an acidity equivalent to about 0.15% sulfuric acid to an alkalinity equivalent to about 0.20% magnesium oxide, adding water for ripening and then ripening and stabilizing the cellulose acetate in the primary solution to a secondary cellulose acetate at a temperature of at least 125° C. and at a pressure of at least 20 pounds per square inch.

GEORGE W. SEYMOUR.
BLANCHE B. WHITE.
ANTHONY J. BELLUCCI.

REFERENCES CITED

The following references are of record in the file of this patent:

UNITED STATES PATENTS

| Number | Name | Date |
|---|---|---|
| 2,022,446 | Walter et al. | Nov. 26, 1935 |
| 2,028,762 | Dreyfus | Jan. 28, 1936 |
| 2,071,333 | Dreyfus | Feb. 23, 1937 |